United States Patent Office 3,447,389
Patented June 3, 1969

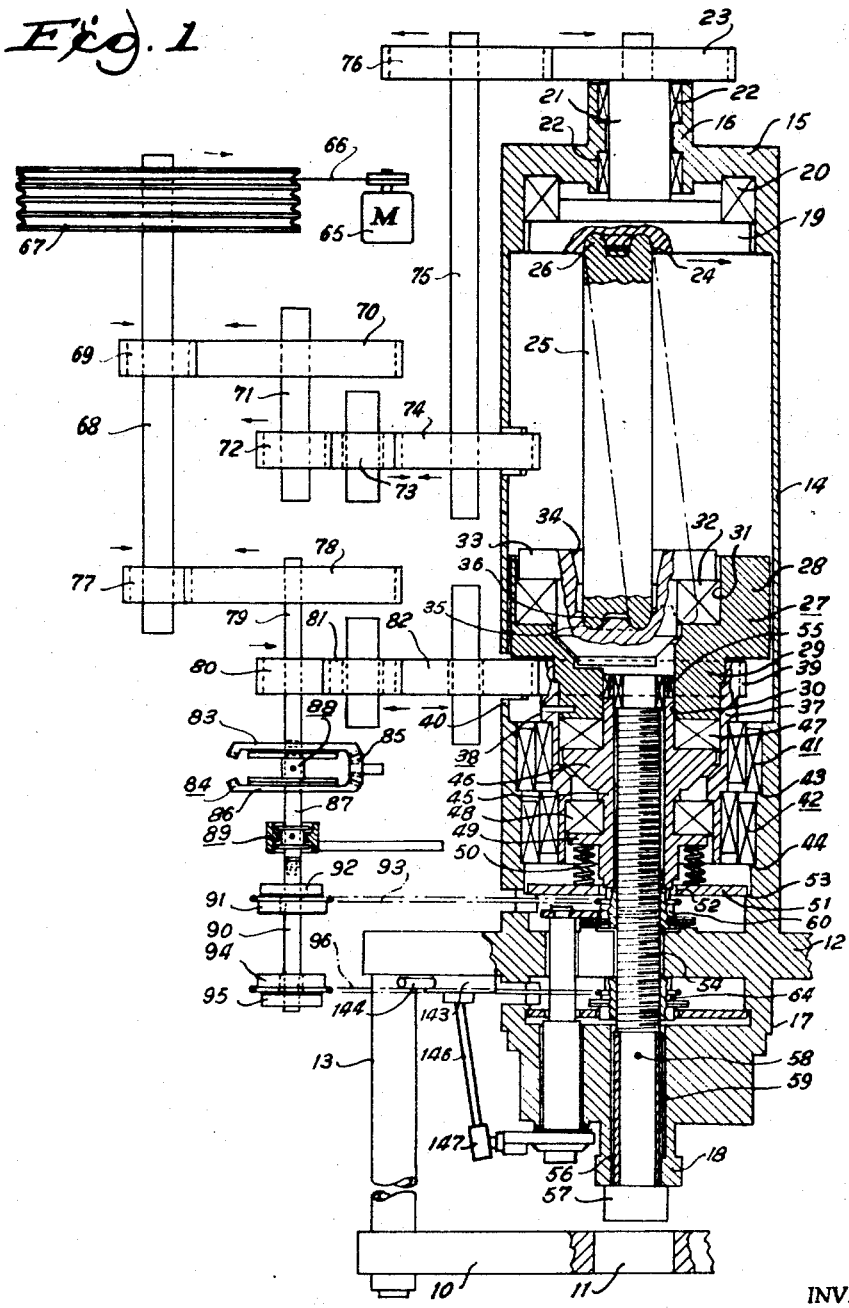

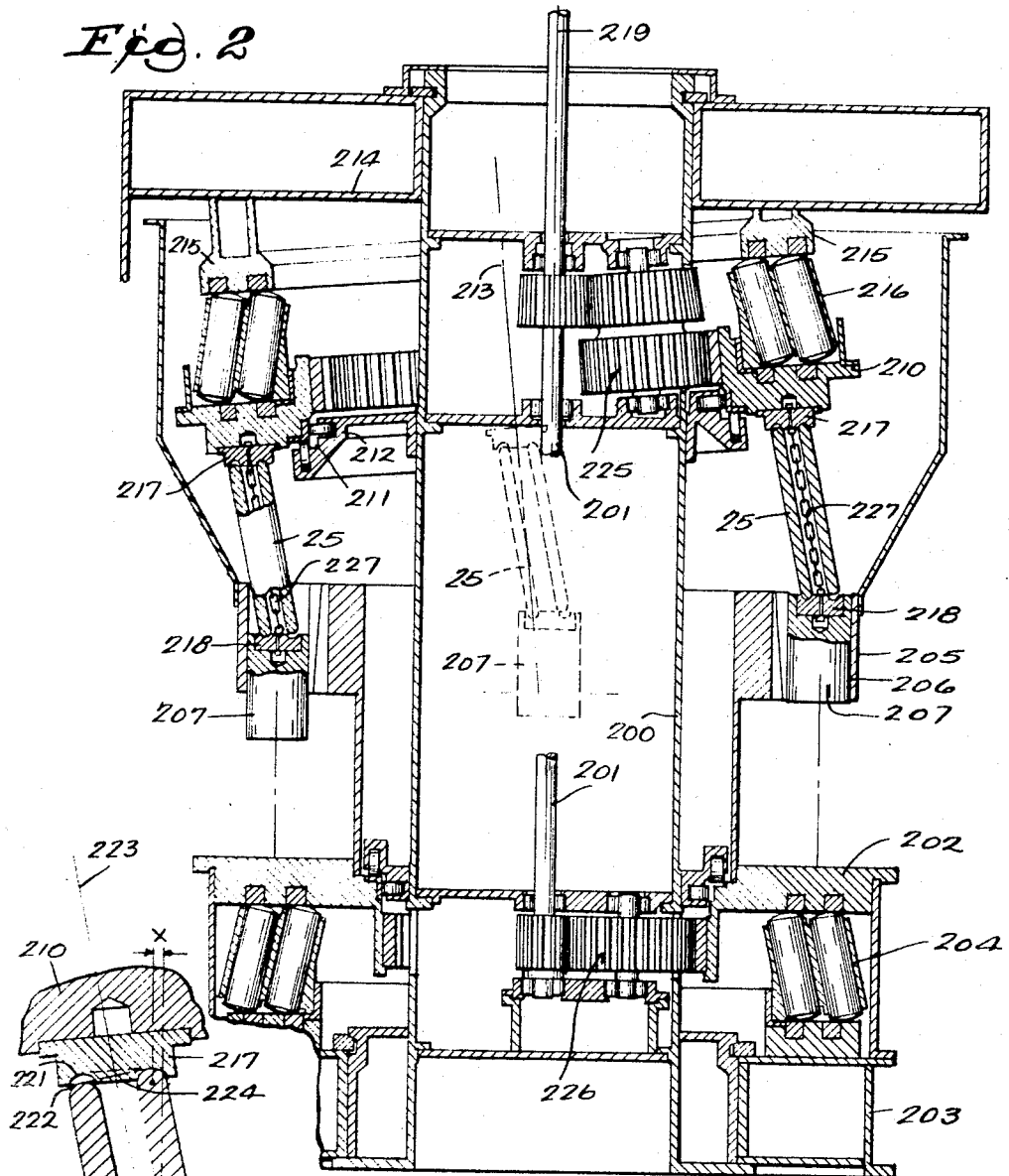

3,447,389
THRUST TRANSMITTING DEVICE
John D. Hamaker, 4401 N. Grand River Ave.,
Lansing, Mich. 48906
Continuation-in-part of applications Ser. No. 541,871,
Feb. 24, 1966, and Ser. No. 304,036, Aug. 23,
1963, now Patent No. 3,244,014. This application
July 17, 1967, Ser. No. 653,966
Int. Cl. F16h 21/22
U.S. Cl. 74—44                              4 Claims

ABSTRACT OF THE DISCLOSURE

A thrust transmitting device including a pair of spaced sockets having annular grooves formed therein in face relation and a wobbly pin extending between the sockets. At both of its ends, the wobbly pin has annular ribs respectively engaged in the socket grooves. The longitudinal axis of the wobbly pin is inclined to the plane in which the socket grooves are disposed, whereby relative movement of the sockets will cause the annular ribs of the wobbly pin to roll in the socket grooves. This device has particular utility in converting rotational movement to reciprocal movement.

*Cross-reference to related applications*

This application is a continuation-in-part of my U.S. application Ser. No. 304,036, filed Aug. 23, 1963, now U.S. Patent 3,244,014, issued Apr. 5, 1966, and my U.S. application Ser. No. 541,871, filed Feb. 24, 1966, now abandoned.

*Background of the invention*

Various ball in socket pin arrangements for converting rotational movement to longitudinal movement are known in the art, such as the devices disclosed in U.S. patent to Hawes, 2,181,234, and the U.S. patent to Shepard, 2,420,984. The structures shown in these patents are characterized by high friction between the ball and socket elements because these elements are subject primarily to sliding friction. The relatively high friction losses which characterizes these prior devices limits their load transmitting capabilities and results in excessive wear with resultant maintenance problems and limitations on useful life.

*Summary of the invention*

The wobbly pin and socket arrangement of the present invention is capable of transmitting thrusts of large magnitude with greatly reduced friction losses and with relatively low power input requirements. Friction losses are minimized because the novel wobbly pin thrust transmitter of the present invention is subject primarily only to rolling friction, as distinguished from the sliding friction of the prior devices.

Rolling friction is achieved in the novel wobbly pin structure of the present invention by reason of the configuration of the ends of the wobbly pin which are each provided with an annular rib which is engaged in an annular groove in an end socket through which thrust force is transmitted. The longitudinal axis of the wobbly pin is inclined to the plane in which the socket groove is disposed. Accordingly, there is only a tiny area of physical contact between the thrust transmitting portion of the rib and the groove wall. As the mechanism operates, the rib rolls circumferentially in the groove, thus successively transferring the point of thrust transmission around the circumference of the rib and mating groove wall. This structure is subject primarily only to rolling friction and is substantially free of the sliding friction which characterizes the prior art. Accordingly, the wobbly pin of the present invention is ideally suited to sustain very high loads without substantial wear and other losses attributed to friction.

Other objects, features and advantages of the invention are referred to in my U.S. Patent 3,244,014 aforesaid, and will also appear in the following disclosure.

*Description of the drawings*

FIG. 1 is a diagrammatic view, partly in elevation and partly in section, illustrating one embodiment of a thrust transmitting device of the invention.

FIG. 2 is a view partly in elevation but mostly in vertical cross section taken through a rotary press which embodies the present invention in a specifically different environment.

FIG. 3 is a fragmentary enlarged view of the wobbly pin and thrust sockets.

FIG. 4 is a diagrammatic view illustrating the paths of movement of the respective top and bottom thrust sockets at the ends of one of the wobbly pins of the embodiment shown in FIG. 2.

*Preferred embodiments of the invention*

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the embodiment of the invention shown in FIG. 1, the numeral 10 designates a lower transverse frame member adapted to receive a female die member or other workpiece in a central aperture 11, and being connected to an upper transverse frame member 12 by upstanding posts 13. A tubular or cylindrical shell or housing 14 extends upwardly from the transverse frame member 12, terminating at its upper end in a cap 15 having a central, apertured neck 16. The housing 14 is formed with various internal, annular shoulders as will be described further hereinafter, and a somewhat shorter, axially alined housing 17 extends downwardly from the frame member 12, being also provided with a central, depending, apertured collar 18.

An upper head 19 is rotatably mounted in the cap 15 upon a suitable bearing or bearings 20, preferably a thrust bearing, and carries an upstanding stub shaft 21 extending upwardly through the neck 16 and rotatably positioned therein by suitable bearings 22. A gear wheel 23 is secured to the upper end of the stub shaft 21.

In the lower surface of the head 19, there is formed a circular groove 24 having a transverse cross-section semicircular in shape and being positioned eccentrically with respect to the axis of rotation of the head 19. An elongate wobbly pin 25 carries on its upper end a circular rib 26, also semicircular in transverse cross-section, or generally, in the shape of one-half of a torrid so as to be complementary in size and shape to the groove 24. The rib 26 is received in the groove 24 and is free to rock therein about its longitudinal axis, the pin 25 revolving with the head 19 so that there is no relative motion therebetween, but the rib 26 otherwise having a true rolling action in the groove 24 so as to present a minimum of frictional resistance as the wobbly pin 25 undergoes its wobbling or rocking action.

A lower head or head assembly 27 is disposed in the housing 14 below the upper head 19, and spaced therefrom by the wobbly pin 25, and includes an outer head member 28 having a depending axial neck 29 with an axial bore 30. An eccentric recess 31 is formed in the upper surface of the head member 28 and receives a thrust bearing 32 upon which a rotating socket member 33 is supported within the eccentric recess 31. The socket member 33 is formed with an axial socket 34 extending downwardly thereinto and having in its bottom a circular groove 35 receiving the circular rib 36 on the lower end of the wobbly pin 25 in substantially the same manner and relationship that the rib 26 at the upper end of the wobbly pin is received in the groove 24. Independent of the relative directions of rotation and the relative rotational speeds of the upper head 19 and the lower head assembly 27, which will be designated as the lower head, the socket member 33 will revolve with the wobbly pin 25, so that there may be relative rotational movement between the lower head member 28 and the socket member 33. Thus a rolling engagement occurs between both the upper and the lower ends of the wobbly pin 25 and their respective sockets. As will appear more fully hereinafter, the rotation, nonrotation, relative speeds of rotation and direction of rotation of the upper and lower heads may be varied over very wides ranges, as well as the length of the wobbly pin 25 and the eccentricity of the grooves 24 and 35, resulting in a wide variation of the number of impulse strokes per minute as well as the amplitude of such strokes. Assuming, however, a wobbly pin approximately 16 inches in length, an eccentricity of the upper groove 24 of 15/16 of an inch with respect to the axis of the head 19, and an eccentricity of the bottom groove 35 of one inch with respect to the axis of the head assembly 27, a thrust stroke of approximately 1/8 of an inch will be obtained.

The head member 28 carries on its downwardly extending neck 29 an external gear sleeve 37 pinned to the member 28 at 38 so as to revolve therewith and carrying external gear teeth 39 in registry with a radial opening 40 cut in the side wall of the housing 14. Suitable upper and lower bearings 41 and 42 are disposed between the lower exterior of the gear sleeve 37 and the interior of the housing 14, the bearings resting upon suitable internal shoulders 43 and 44, respectively, in the housing and being of a type to permit limited longitudinal movement of the gear sleeve within the housing as the head member 28 and socket member 33 so move in the housing.

A thrust sleeve 45 is disposed within the gear sleeve 37 and has an upper, external, annular flange 46 with a thrust bearing 47 being disposed between the upper side of the flange 46 and the lower end of the neck 29 of the lower head assembly 27. A radially loaded bearing 47' encircles the upper end of the thrust sleeve within the neck 29. Also, a radially loaded bearing 48 encircles the thrust sleeve 45 below the flange 46 and engages the inner periphery of the gear sleeve 37 so as to center the thrust sleeve rotationally within the gear sleeve. Below the bearing 48, the thrust sleeve carries a lower, external, annular flange 49, and a plurality of springs 50 are disposed between the underside of the flange 49 and a transverse plate 51 having a central aperture 52 and being supported upon an internal annular shoulder 53 within the lower portion of the housing 14. Thus, the springs 50 tend constantly to urge the thrust sleeve 45, and thus the gear sleeve 37 and the head assembly 27 upwardly within the housing 14, such upward movement being limited by the relative spacing between the upper head 19 and the lower head 27 at any given movement by reason of the position of the wobbly pin 25. An elongate screwthreaded rod or pin 54 telescopes the tubular thrust sleeve 45, having a guiding bushing or bearing 55 at its upper end slidably engaging the bore of the sleeve 45, and carrying on its lower end an elongate collar 56 extending downwardly through the collar 18 and having on its lower end a male die or other workpiece 57. The sleeve 56 is secured to the screw 54 by a set screw 58, and is held against rotation within the lower housing 17 by means of an elongate spline 59 provided between the sleeve or collar 56 and the bore of the lower housing.

A driving or feeding nut 60 having external sprocket teeth, is in screwthreaded engagement with the screw 54 immediately below the lower end of the thrust sleeve 45 and is adapted to be engaged by the thrust sleeve for forcing the screw 54 downwardly. The nut 60 has an external outwardly projecting flange 61 on its lower end with a friction member 62 and an antigalling face 63 on its upper and lower faces, respectively.

Below the upper transverse frame member 12, a holding nut 64, similar to the nut 60 and having external sprocket teeth, is received in screwthreaded relationship upon the screw 54 and is adapted through rotary movement to screw upwardly upon the screw 54, engaging the underside of the frame member 12 and limiting upward movement of the screw 54 within the thrust sleeve 45.

For driving the upper and lower heads 19 and 27 as well as the driving nut 60 and the holding nut 64 any suitable prime mover or source of rotative motion may be employed, such as for a thrust mechanism producing 1/8 inch long, twenty-ton power strokes for 1/2 minute (1/2 minute idle) and neglecting friction and flywheel effect, a 1/3 horsepower electric motor will deliver twelve power strokes per minute.

The motor, or other driving means 65 is operatively connected, as by a belt 66 to a multiple groove pulley 67 carried upon a shaft 68. Desirably, the driving means will be provided with a step cone pulley so that the pulley 67 and shaft 68 may be driven at various selective speeds. A gear wheel 69 mounted on the shaft 68 drives a gear wheel 70 mounted on a shaft 71 carrying a second gear 72 which drives a gear 73, the latter, in turn, driving a gear 74 carried upon a shaft 75. A gear wheel 76 mounted on the upper end of the shaft 75 meshes with the gear wheel 23 to drive the upper head 19.

The gear wheel assembly and shaft 71 are mounted for movement in a horizontal arc, and accordingly, the gear 70 may be replaced with other gears having a different tooth count to increase or decrease the speed of rotation of the head 19, and accordingly, increase or decrease the number of thrust impulses per minute. In this manner, the number of thrust strokes per minute may be varied from a relatively few to quite a few hundred strokes per minute.

The shaft 68 also carries a gear wheel 77 meshing with a gear wheel 78 revolving a shaft 79 upon which is mounted a gear wheel 80 meshing with a gear wheel 81 which, in turn, meshes with a gear wheel 82. The periphery of the gear wheel 82 extends through the opening 40 into engagement with the gear teeth 39 of the gear sleeve 37 so that the lower head assembly 27 is driven simultaneously with the upper head 19, but either at a different speed or in a different direction of rotation. In the particular arrangement shown in FIG. 1, the upper and lower heads are being rotated in the same direction at different speeds.

The gear wheel 70 may be completely disengaged from the gear wheel 69 so as to break the driving train to the upper head 19, and as will appear more fully hereinafter, suitable stop means may be utilized for holding the upper head 19 against revolution so that only the lower head 27 is being driven. Of course, the meshing of the teeth of the gear 82 with the gear teeth 39 of the gear sleeve 37 permits the latter to undergo limited vertical reciprocation without the loss of the driving function.

The shaft 79 is extended beyond the gear wheel 80 and drives a first miter gear 83 of a reversing mechanism designated generally as the numeral 84, the miter gear 83 driving a reversing gear 85 which, in turn, drives a second miter gear 86 axially alined with the first miter gear 83 but turning in the opposite direction. An intermediate floating shaft 87 is axially alined with the shaft 79 but is freely rotatable with respect thereto as well as being free to undergo limited longitudinal movement. The floating shaft 87 is driven by a double-faced clutch assembly 88 and is provided with a suitable mechanism 89 for shifting the shaft 87 longitudinally and bringing the clutch assembly 88 into engagement with either the miter gear 83 or the miter gear 86 so as to drive the shaft 87 selectively in either direction.

A shaft 90 is axially alined with the shaft 87 and driven thereby, but the shaft 87 is also free to undergo limited longitudinal movement with respect to the shaft 90. The latter carries a first sprocket gear wheel 91 driven from the shaft 90 through a slippable driving connection 92 and driving a sprocket gear chain 93 which, in turn, operates the driving nut 60. A second sprocket gear wheel 94 is also mounted on the shaft 90 and driven therefrom through a slippable driving connection 95 The sprocket gear wheel 94 drives a sprocket gear chain 96 which drives the holding nut 64. Thus, at all times the shaft 90 is being driven, torque is being transmitted to the driving nut 60 and the holding nut 64, but such torque is only of the order of magnitude that a resistance of a few pounds will cause the driving connections 92 and 95 to slip, so that the nuts may remain stationary when such is necessary to the operation of the inching screw arrangement.

The structure whereby the ends of the wobbly pin engage the upper and lower heads is subject to variation, but the type of end portion for the wobbly pin and the groove for reception thereof as shown in FIG. 1 is the preferred construction.

In the operation of the mechanism, one of the heads 19 and 27 is held against rotation while the other rotates, both heads rotate in the same direction together, both heads rotate but in opposite directions, or both heads rotate in the same direction but at differing speeds. As the mechanism functions, the wobbly pin necessarily causes the movable head to undergo reciprocal movement of small amplitude, which movement is transmitted to the thrust sleeve 45, causing the latter to be forced downwardly under the thrust developed by the wobbly pin 25, and to move upwardly under the influence of the springs 50 as the wobbly pin moves past bottom dead center and begins to approach top dead center.

Assuming the reversing mechanism 84 and 89 is set for downward travel of the inching screw 54, the driving nut 60 and holding nut 64 will be receiving a constant torque tending to revolve them in a direction to move them upwardly on the screwthreaded member 54, and consequently, the driving nut 60 will constantly be driven into engagement with the lower end of the thrust sleeve 45. Now, as the sleeve 45 is moved downwardly, the driving nut 60, being in engagement with the lower end thereof, will drive the screw member 54 downwardly, but at such time, the nut 60 will not be revolving upon the screw member due to its abutment with the sleeve 45, and consequently, its slippage mechanism 92 will be slipping with respect to its sprocket gear wheel 91. As the screw member 54 moves downwardly, however, the holding nut 64 is moved away from abutment against the underside of the frame member 12, freeing the holding nut 64 for revolution upon the screw member 54 so as to move upwardly and come again into abutment with the underside of the frame member 12. This action continues until the bottom dead center point of the stroke is reached, at which time, the holding nut 64 will be in engagement with the underside of the frame member 12, preventing a return upward movement of the screw member. As the thrust sleeve 45 moves upwardly under the impetus of the springs 50, however, its lower end will be moved away from the driving nut 60, allowing the same to resume rotation and to follow the thrust sleeve 45 upwardly for reception of the next succeeding stroke. In this manner, the thrust sleeve 45 reciprocates through relatively small upward and downward strokes, the driving nut moving upwardly and downwardly with the thrust sleeve 45 but transmitting to the screwthreaded member 54 only the downward strokes. The holding nut 64 likewise moves upwardly and downwardly and functions at all times to prevent upward movement of the screwthreaded member 54, allowing only the downward movement thereof so that the screwthreaded member 54, along with the die or workpiece 57, is steadily moved downwardly in increments of small amplitude but under thrust forces of large magnitude. The amplitude of upward movement of the driving nut 60 is regulated through adjustment of the yoke member 137, and accordingly, the amplitude of each downward stroke is accordingly adjusted.

When the screwthreaded member 54 is to be retracted to an upper position, the reversing mechanism 84 and 89 is actuated to reverse the direction of rotation of the driving nut 60 and the holding nut 64, and through simple rotation of the two nuts, the screwthreaded shaft 54 is moved upwardly.

FIGS. 2, 3 and 4 relate to another embodiment of the invention. These figures illustrate a large high capacity multiple ram rotary press. Purely by way of example and to indicate the size and capacity of the press, the press may be about fifteen feet in diameter and about twenty feet high. The closing press capacity of each ram is approximately 18,000 tons (36 million pounds). No claim is made in this application to the press as such, as this will be the subject of another patent application. The press is illustrated in this application solely to illustrate an environment in which wobbly pins 25 are utilized.

The press has a central stationary cylindrical column 200 (about five feet in diameter) about which various other components of the press will rotate. Near the bottom of the press there is a rotating annular work table 202 which is supported from the press base 203 on long radius bearings 204, such as those shown in my U.S. Patent 3,194,618.

Rotatable with the table 202 is an axially spaced overhanging ram carrier 205 which has a series of circumferentially spaced ram sockets 206 in which a like series of rams 207 are guided for vertical movement with respect to a workpiece which is disposed between the ram 207 and the table 202.

The mechanism for imposing longitudinal closing pressure on the rams 207 is disposed near the top of the column 200 and comprises an annular driven rotor 210 which is mounted on suitable bearings 211 on a track 212 fixed to the column 200. Track 212 and rotor 210 are inclined at an angle to the bed 202 and ram carrier 205. While the angle can vary from one machine to another, the angle of the machine shown in the drawings is ten degrees. The inclined axis of rotation of rotor 210 is indicated at 213. In addition to its incline, axis is shifted laterally of the axis of rotation 219 of table 202 and ram carrier 205.

Above the rotor 210 and fixed to the head 214 of the column 200 is a circular bearing race 215 which is also disposed in a plane which is inclined to the horizontal at the same angle as track 212 and rotor 210. Between the race 215 and the rotor 210 are disposed another series of long radius bearings 216 which are also in accordance with my U.S. Patent 3,194,618.

The annular undersurface of rotor 210 is provided with a series of wobbly pin thrust engaging top sockets 217, equal in number to the rams 207. There is a corresponding number of bottom sockets 218 mounted on the tops of each of the plungers 207. The wobbly pins 25 span between the sockets 217, 218 to transmit vertical thrust to the rams as a consequence of the rotation of the rotor 210.

As best shown in FIG. 3, the sprockets 217, 218 and wobbly pins 25 are of the same basic construction as like elements shown in FIG. 1. The sockets 217, 218 have annular grooves 221 and the ends of the pin 25 have matching annular ribs 222. These may have mating semicircular cross sectional shapes. The longitudinal axes 223 of the respective wobbly pins 25 are at all times disposed at an angle to the faces 224 of the sockets 217, 218 in which the grooves 221 are formed. Accordingly, there is only a small area of contact between contacting portions of the rib 222 and wall of socket grooves 221. The rib 222 and wall of groove 221 are in substantially line contact on a radial plane through the axis 223 of pin 25. All other portions of the rib and socket groove wall are out of contact and can develop no friction therebetween.

Rotary motion is imparted simultaneously and at the same rate by power shaft 201 to rotor 210, ram carrier 205 and table 202. A series of intermeshed gears 225 powers the rotor 210. a similar set of intermeshed gears 226 powers the table 202, and at the same time the ram carrier 205, which is carried by table 202. By reason of the inclination of the tracks 212, 215 and rotor 210, the rams 207 will be successively projected from their sockets against the work and will be withdrawn into their sockets in each complete revolution of the press. The rams are shown withdrawn at the right side of FIG. 2 (top dead center position) and are shown projected at the left side of FIG. 2 (bottom dead center position). An intermediate position is shown in FIG. 2, portions of the shaft 201 and column 200 being broken away to expose this position. In the embodiment illustrated in the drawing, the maximum stroke of each plunger 207 is ten and one-half inches.

The rams 207 are withdrawn into the sockets 206 as they move from their positions shown at the left side of FIG. 2 to the right side of FIG. 2 by a loose retraction link 227. As illustrated, this may simply consist of a chain having its ends anchored to the respective sockets 217, 218.

The eccentric or noncoaxial orbit paths of the top socket 217 and bottom socket 218 for each wobbly pin as the press rotates are illustrated in the diagrammatic view of FIG. 4. The bottom sockets 218 orbit on the path 231 and the top sockets 217 orbit on the path 232. The paths 231, 232 are fixed, as established by the geometry of the supporting ram carrier 205 and rotor 210. These parts comprise means for limiting lateral movement of one socket with respect to the other socket.

As these paths are eccentric, top socket 217 will be on the "inside" path for one-half of a complete press rotation and will be on the "outside" path for the other one-half of a complete rotation. The converse is true of bottom socket 218. As the press rotates, the sockets 217, 218 travel on continuously converging and diverging paths, as indicated in FIG. 4.

By reason of the rotation of the rotor 210 and ram carrier 206, the respective sockets 217, 218 will rotate 360 degrees about their own axes in each complete revolution of the press. Accordingly, in one-half of each press revolution, for example, from top dead center positions shown at the right hand side of FIG. 2 to the bottom dead center positions shown at the left hand side of FIG. 2, each socket 217, 218 has rotated 180 degrees on its own axis.

But the wobbly pins 25 do not rotate about their own axes 223 as the press revolves. The offset of axes 213, 219 and the inclined angle of axes 223 to the plane of the sockets in which grooves 221 are formed, establishes a system of motion which prevents rotation of the pins 25 about their own axes 223. Accordingly, as the press rotates to orbit the sockets 217, 218 on their eccentric paths shown in FIG. 4, the annular grooves 221 in sockets 217, 218 will roll around ribs 222 of the wobbly pins 25 in opposite directions relative to the pin and at the same angular velocity. Therefore no rotation is imparted to the pins 25. The arc through which the ribs have rolled for various sequential positions of the wobbly pin as the press rotates counterclockwise in the direction of arrow 228 shown in FIG. 4 (starting from the right side position shown in FIG. 2) is indicated by the shaded segments 233 in FIG. 4.

Accordingly, while the wobbly pin at the left side of FIG. 2 is in the same inclined position as the wobbly pin at the right side of FIG. 2, the respective sockets 217, 218 at the left in FIG. 2 are rotated 180 degrees from the sockets 217, 218 at the right in FIG. 2. The annular ribs 222 at the ends of the wobbly pin at the left in FIG. 2 have rolled 180 degrees around the grooves 221 with respect to those illustrated at the right in FIG. 2.

Accordingly, the rotary motion of the shaft 201 has produced a reciprocating motion of the rams 207 through the thrust transmitting wobbly pins in a mechanism in which 18,000 tons of pressure has been transmitted by each wobbly pin in moving from top dead center to bottom dead center in a motion which is substantially entirely characterized as rolling friction with no substantial sliding friction between the bearing parts.

The distance X marked in FIGS. 3 and 4 (exaggerated in FIG. 4) indicates any offset from a true vertical thrust axis through the wobbly pin from socket 217 to socket 218. If distance X equals zero, there is no offset and there will be no sliding friction between the rib 222 and groove wall 221 as the rib rolls in the groove. If distance X has a finite measurement, some small factor of sliding friction will be introduced into the system, although this will be infinitesimal compared to sliding friction which has been eliminated by the wobbly pin structure. To achieve the maximum advantages of the invention, the distance X should be kept as small as possible. In FIG. 4, the distance X is greatly exaggerated to separate the circles representing sockets 217, 218. With a normal distance X, as indicated in FIG. 3, the circles 217, 218 in FIG. 4 would overlap.

Because the plane of rotor 210 is inclined to the horizontal, the angle of incline of pin axis 223 to the plane of the face of socket 217 is less than the angle of incline of pin axis 223 to the plane of the face of socket 218. This is of no substantial consequence, as the pin rib will roll in the socket groove as long as the pin axis has any incline to the plane of the socket face.

I claim:

1. A mechanical thrust transmitting device including a pair of spaced sockets having annular grooves formed therein in facing relationship, and a wobbly pin extending between the sockets, the wobbly pin having upon its respective ends annular ribs respectively engaged in the socket grooves, the longitudinal axis of the pin and the planes in which the ribs lie being at all times inclined to the planes in which the socket grooves are disposed and contact of the wobbly pin with the sockets being limited to the local area where a rib touches a socket groove, whereby relative movement of the sockets will cause the annular ribs of the wobbly pin to roll in the socket grooves, and means other than the pin for limiting lateral movement of one socket with respect to the other socket.

2. The device of claim 1 in which the ribs and grooves have mating semicircular cross sectional shapes.

3. The device of claim 1 in combination with means to cause relative movement of the sockets about eccentric axes.

4. In a machine which requires the transmission of a thrust force between spaced facing socket elements having annular grooves, a wobbly pin extending between said socket elements and having ends with annular ribs respectively engaged in the grooves of the sockets, and means supporting the socket elements and wobbly pin in assembled relation in which the longitudinal axis of the wobbly pin and the planes in which the ribs lie are at all times inclined to the planes in which the socket grooves are disposed and contact of the wobbly pin with the sockets being limited to the local area where a rib touches a socket groove, whereby relative movement of the sockets will cause the annular ribs of the wobbly pin to roll in the socket grooves, and means other than the pin for limiting lateral movement of one socket with respect to the other socket.

References Cited

UNITED STATES PATENTS

| 2,181,234 | 11/1939 | Hawes | 74—22 |
| 369,233 | 8/1887 | Coxe et al. | 74—86 |
| 3,244,014 | 4/1966 | Hamaker | 74—44 |

MILTON KAUFMAN, *Primary Examiner.*

U.S. Cl. X.R.

74—22; 86